July 4, 1972  J. J. MORONEY ET AL  3,674,325

BEARING

Filed Nov. 27, 1970

INVENTORS
JOHN J. MORONEY
EDWIN B. THARP
BY

ATTORNEY

United States Patent Office 3,674,325
Patented July 4, 1972

3,674,325
BEARING
John J. Moroney, Torrington, and Edwin B. Tharp, Prospect, Conn., assignors to The Torrington Company, Torrington, Conn.
Filed Nov. 27, 1970, Ser. No. 93,186
Int. Cl. F16c 21/00
U.S. Cl. 308—35
3 Claims

ABSTRACT OF THE DISCLOSURE

A roller bearing including concentric inner and outer races with a series of rollers located therebetween and end plates mounted on each end of the inner race and extending over the end faces of the outer race. A self-lubricating washer is disposed between each end plate, the adjacent end race of the outer race and the ends of the rollers and a spacer washer is provided to prevent the ends of the rollers from wearing away the self-lubricating washer.

BACKGROUND OF THE INVENTION

This invention relates to bearings and more particularly to roller bearings. Roller bearings are often used where they cannot be lubricated properly and where they are subject to dirt and dust which rapidly destroys them. It is conventional to provide bearings with self-lubricating washers or seals. In many prior art arrangements, the self-lubricating washers are likely to wear away in an unduly short time.

SUMMARY OF THE INVENTION

The principal object of this invention is to provide a novel self-lubricated roller bearing having a self-lubricating member with an extended life.

Another important object is to provide a self-lubricated roller bearing containing a self-lubricating washer that is held together as it wears away.

In general, the objects of this invention are provided by using a self-lubricating washer or seal between the bearing end plates and the ends of the bearing elements, such as the bearing outer race and the bearing rollers, and using a spacer between the self-lubricating washer and the ends of the rollers.

BRIEF DESCRIPTION OF THE DRAWING

The invention is described in connection with the accompanying drawing wherein.

DESCRIPTION OF THE PREFERRED EMBODIMENT

Figure 1:
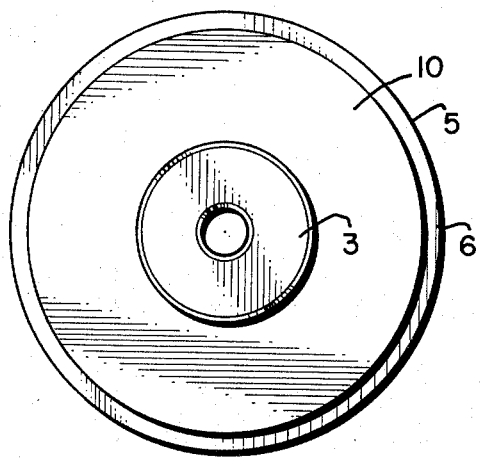
FIG. 1 is an end face view of a bearing embodiment of the invention.
Figure 2:
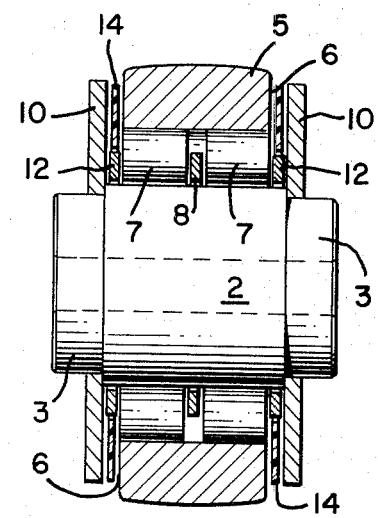
FIG. 2 is an axial section of FIG. 1.
Figure 3:
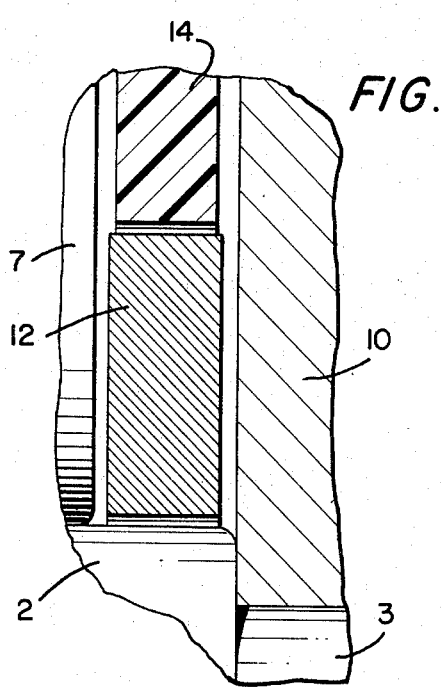
FIG. 3 is an enlarged fragment of FIG. 2.

The bearing 1 shown in the drawing includes a cylindrical inner race 2 having a periphery adapted to serve as a bearing race and further having short integral trunnions 3 projecting from both ends. The trunnions 3 have a reduced diameter relative to the diameter of the inner race 2. An annular outer race 5 concentrically surrounds the inner race 2 and contains a cylindrical inner bore to serve as a bearing race. The outer race 5 has end faces 6 which are perpendicular to its axis. A series of rollers 7 are disposed between the inner and outer races 2 and 5. Two annular groups or complements of rollers 7 are shown with an annular center spacer 8 between the two annular groups. The particular arrangement of rollers is not a part of this invention and a single group of rollers extending over the full length of the races can be used as an alternative. A pair of outer washers or plates 10 are attached on the trunnions 3 and extend radially outward over the end faces 6 of the outer race 5.

In use, the end plates 10 are held in place on the trunnions 3 by a pair of spaced bearing mounting arms (not shown) which receive the two trunnions 3. Normally, the mount for the bearing may be a bifurcated device such as a clevis with the bearing 1 located between the spaced arms of the clevis. The end plates may be press-fitted on the trunnions 3 to hold the bearing together prior to being installed in the mounting arms.

An annular end spacer 12 is loosely mounted over each end of the inner race 2 between the ends of the rollers 7 and the end plates 10. The radial dimension of the end spacers 12 is relatively small as shown in the drawing; preferably, the diameter of each spacer 12 is such that its periphery lies about midway between the inner race 2 and the interior bore of the outer race 5. A self-lubricating thrust washer 14 rotates around the periphery of each end spacer 12 extends radially between the end faces of the outer race 5 and the end plates 10. The thrust washers 14 are at least as thin and may be slightly thinner than the end spacers 12 so that the ends of the rollers 7 do not wear them away prematurely.

The thrust washers 14 may be made of a plastic material such as Nylon or Teflon filled with a lubricant such as graphite or molybdenum disulfide. In high temperature applications, the plastic can be a polyimide resin. They can also be a carbon material.

The self-lubricating thrust washers 14 reduce the friction between the outer race 5 and the end plates 10. In addition, as the thrust washers 14 wear, the worn material drops between the rollers 7 to serve as a lubricant. Finally, the center portion of the thrust washers 14, located inwardly of the outer race 5, is protected from wear by the end spacers 12 and aids in holding the washer 14 together as its outer portion is thinned from wear, providing the washer 14 with an extended life.

While only a single embodiment is shown and described in detail, this invention is not limited merely to this embodiment, but contemplates other embodiments and variations which utilize the concepts and teachings of this invention.

What is claimed is:
1. A bearing comprising:
   an inner race having trunnion ends, a concentric outer race having a bore and a series of rollers disposed in said bore between said races;
   said outer race having end faces and a pair of axially spaced plates pressed on said trunnion ends and extending radially over the end faces of said outer race;
   a self-lubricating washer disposed between each of said plates, the ends of the rollers and the adjacent end face of said outer race, and means located between each of said plates and the ends of said rollers to prevent said rollers from forcing said self-lubricating washer against its plate whereby said self-lubricating washer is protected from being worn away by the ends of said rollers.

2. The bearing of claim 1 wherein:
said means is a spacing washer having a thickness greater than said self-lubricating washer.

3. The bearing of claim 2 wherein:
said spacing washer has a diameter which is substantially less than the diameter of the bore in said outer race.

References Cited
UNITED STATES PATENTS

| | | | |
|---|---|---|---|
| 3,580,170 | 5/1971 | Furman | 308—35 |
| 3,497,277 | 2/1970 | Malott | 308—187 |
| 3,344,689 | 10/1967 | Naumann | 308—35 |

MARTIN P. SCHWADRON, Primary Examiner

B. GROSSMAN, Assistant Examiner

U.S. Cl. X.R.

308—163